US012059899B2

(12) United States Patent
Brown et al.

(10) Patent No.: US 12,059,899 B2
(45) **Date of Patent: *Aug. 13, 2024**

(54) METHOD OF MONOCHROME PRINTING AT HIGH SPEEDS

(71) Applicant: Memjet Technology Limited, Dublin (IE)

(72) Inventors: Brian Brown, North Ryde (AU); Julie Hogan, Dublin (IE); Ronan Palliser, Dublin (IE); Keshu Nazneen, Dublin (IE); Juliette Le Hir, Dublin (IE); Rodney Hardy, North Ryde (AU)

(73) Assignee: Memjet Technology Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,931

(22) Filed: Jun. 22, 2023

(65) Prior Publication Data

US 2023/0330992 A1 Oct. 19, 2023

Related U.S. Application Data

(63) Continuation of application No. 17/468,164, filed on Sep. 7, 2021, now Pat. No. 11,724,502.

(Continued)

(51) Int. Cl.

*B41J 2/045* (2006.01)
*B41J 2/145* (2006.01)

(52) U.S. Cl.

CPC ........... *B41J 2/145* (2013.01); *B41J 2/04505* (2013.01); *B41J 2/04586* (2013.01)

(58) Field of Classification Search

CPC ...... B41J 2/145; B41J 2/2135; B41J 2/04505; B41J 2/04586; B41J 2202/20; B41J 2202/21; B41J 2/0451; B41J 2/04513; B41J 2/04515; B41J 2/0452; B41J 2/04503; B41J 2/04506; B41J 2/04508; B41J 2/04536; B41J 2/04545; B41J 2/04538; B41J 2/0454; B41J 2/04548; B41J 2/04551; B41J 2/04553; B41J 2/04555; B41J 2/04556; B41J 2/13; B41J 2/04565; B41J 2/0457; B41J 2/04571; B41J 2/04573

See application file for complete search history.

(56) References Cited

U.S. PATENT DOCUMENTS

| | | | | |
|---|---|---|---|---|
| 11,724,502 B2 * | 8/2023 | Brown | ..................... | B41J 2/145 347/14 |
| 2005/0122354 A1 | 6/2005 | Yamane et al. | | |
| 2006/0125857 A1 | 6/2006 | Silverbrook et al. | | |

FOREIGN PATENT DOCUMENTS

| | | |
|---|---|---|
| EP | 3378659 A1 | 9/2018 |
| WO | WO-2018025003 A1 | 2/2018 |
| WO | WO-2022053258 A1 | 3/2022 |

* cited by examiner

*Primary Examiner* — Kristal Feggins
(74) *Attorney, Agent, or Firm* — Cooley LLP

(57) ABSTRACT

A method of printing an image from a print chip having plurality of horizontal nozzle rows. The method includes the steps of allocating first dot data for an image line of the image to nozzles in a first row portion of a first nozzle row; allocating second dot data for the image line to nozzles in a second row portion; sending the first and second dot data to the print chip and firing respective droplets. Some bits of the first dot data correspond to pixels of the image line aligned with the second row portion, and some bits of the second dot data correspond to pixels of the image line aligned with the first row portion.

10 Claims, 2 Drawing Sheets

Related U.S. Application Data

(60) Provisional application No. 63/076,130, filed on Sep. 9, 2020.

9

METHOD OF MONOCHROME PRINTING AT HIGH SPEEDS

CROSS REFERENCE TO RELATED APPLICATIONS

This application is a Continuation application of U.S. application Ser. No. 17/468,164 filed on Sep. 7, 2021, which claims priority to, and the benefit of U.S. Provisional Application No. 63/076,130 filed on Sep. 9, 2020, the disclosures of each of which are incorporated herein by reference in their entirety for all purposes.

FIELD OF THE INVENTION

This invention relates to methods for single-pass printing using multiple butting print chips, as well as print chips designed for such printing. It has been developed primarily for enabling a wide range of print modes in very high-speed monochrome printheads having multiple nozzle rows.

BACKGROUND OF THE INVENTION

Inkjet printers employing Memjet® technology are commercially available for several different printing formats and markets. For example, certain color printing technologies, such as label printers described in U.S. Pat. No. 8,562,104 and wide format printers described in U.S. Pat. No. 8,480,221, employ color printheads configured for printing CMYK inks from a single printhead. Such color printheads have multiple print chips attached to a manifold distributing multiple ink colors to each print chip, as described in U.S. Pat. No. 7,475,976. More recently, monochrome printheads have been developed using Memjet® technology, particularly to meet the demands of high-speed digital presses, such as those described in U.S. Pat. No. 10,081,204, in which multiple monochrome printheads are aligned along a media feed path. Such monochrome printheads have multiple print chips attached to a manifold delivering a single ink color to each print chip, as described in U.S. Pat. No. 9,950,527.

Both the color printheads and monochrome printheads described above ubiquitously employ a Memjet® print chip 1 (FIG. 1) that is specially designed to enable multiple print chips to be butted together in a line along the printhead. Each nozzle row 3 of the Memjet® print chip 1 shown in FIG. 1 uniquely has a dropped row portion 7 at one end of the print chip, which is vertically offset from a corresponding main row portion 5 containing most nozzles for that nozzle row. Typically, the vertically offset dropped row portions 7 are arranged in a trapezoidal or generally triangular shape (known in the art as a "dropped nozzle region", "displaced nozzle region" or "dropped triangle region") and enable print chips to be butted together while effectively maintaining a constant dot pitch across the join region. An A4 page wide printhead 9 comprised of eleven butting Memjet print chips 1 mounted on a substrate 10 is shown schematically in FIG. 3. Similarly, an A3 printhead may be constructed using 16 butting print chips.

The nozzles in each dropped nozzle portion 7 of a nozzle row 3 are hardwired to fire their nozzles at the same as the nozzles in the corresponding main row portion 5 of that nozzle row. Since there is fixed vertical separation along the media feed direction between nozzles in the dropped nozzle region 11 and the main nozzle region 13, the data sent to the nozzles in the dropped nozzle region is delayed by a predetermined number of lines so that droplets fired from nozzles in the dropped nozzle region can join seamlessly with droplets fired from the main nozzle region to form a single line of print. Typically, there is a fixed separation of 10 dot pitches ("DP") in the media feed direction between each dropped nozzle portion and its corresponding main nozzle portion, when printing at 1600×1600 dpi (i.e., 1 DP=$1/1600$ inch) at a maximum dot-on-dot printing speed (nominally 12 inches per second). Therefore, by delaying the data sent to each dropped nozzle portion by 10 lines of print, seamless printing across the join region can be achieved when printing at 1600 dpi in the media feed direction. A more detailed description of Memjet® print chips having dropped nozzle rows can be found in U.S. Pat. No. 7,290,852, the contents of which are incorporated herein by reference.

In principle, employing all nozzle rows in one print chip for printing one ink color should allow printing at higher print speeds for monochrome printing. However, if one wishes to print at a different print resolution and/or a faster print speed a problem arises in respect of the dropped nozzle compensation method described above. Firstly, the maximum firing frequency of each nozzle is fixed due to the time it takes for each firing chamber to be refilled with ink after droplet ejection. Consequently, the period for one fire cycle (i.e., the time allocated for all nozzles in one print chip to fire) is necessarily limited by the maximum firing frequency. Thus, inkjet nozzles cannot simply be actuated more frequently to print at faster speeds—usually inkjet nozzles already operate at (or close to) their maximum firing frequency. Typically, Memjet® inkjet nozzles have a maximum firing frequency of about 15 kHz.

Secondly, the printed dot pitch must change when printing at a lower print resolution and/or higher speed while the physical separation between the dropped nozzle region and the main nozzle region remains fixed at a nominal $10/1600^{th}$ of an inch in the case of a Memjet® printhead.

If, for example, one wished to print at 5×speed (nominally 60 inches per second) with a vertical print resolution of 1600 dpi, each nozzle row in the dropped nozzle region is offset by 10 print lines ($10/1600^{th}$ inch÷$1/1600$=10) below its corresponding main nozzle row. Since 10 lines corresponds to 2 fire cycles at 5×printing speed, the nozzles in the dropped nozzle region 11 can seamlessly print dots to join with a line of dots printed by nozzles in the main nozzle region 13. Nozzles in each main row portion 5 and corresponding dropped row portion 7 of the same nozzle row 3 always fire at the same time (or, more accurately, within the same row-time), but the dropped row portion is loaded with dot data from two lines after the dot data loaded into the main row portion. Similarly, with a vertical print resolution of 800 dpi the nozzles in the dropped nozzle region 11 can join seamlessly with nozzles from the main nozzle region 13, because the dropped nozzle region is offset by 5 print lines ($10/1600^{th}$ inch÷$1/800$=5), which corresponds to 1 fire cycle at 5×print speed.

On the other hand, if one wished to print at 5×speed with a vertical print resolution of 400 dpi, perfect compensation by nozzles in the dropped nozzle region 11 is not possible. Now the dropped row portions 7 are offset by 2.5 print lines ($10/1600^{th}$ inch÷$1/400$=2.5) from their corresponding main row portions 5. Since 2.5 print lines does not coincide with a whole fire cycle at 5×speed, print artefacts inevitably occur at the transition between the main nozzle region 13 and the dropped nozzle region 11, because dropped row portions cannot print droplets to align with droplets printed from corresponding main row portions. A similar error occurs when printing at 5×speed with a vertical print resolution of 1200 dpi, because the dropped row portions are offset by 7.5 print lines ($10/1600^{th}$ inch÷1/1200=7.5) from their corresponding main row portions.

FIG. 4 shows the variations in error due to the fixed offset of the dropped nozzle region relative to the main nozzle region for various printing resolutions at 5×speed (monochrome) using the method described above. As explained above, minimal errors are achieved with resolutions of 1600 dpi and 800 dpi, while maximal errors occur when printing at 1200 dpi and 400 dpi. With 1 dot pitch nominally deemed to be an acceptable amount of error, it can be seen from FIG. 4 that there are several print modes where acceptable print quality is unachievable. In practice, tolerance for certain artefacts may be different for different types of image content e.g., contone images, line images, text etc.

From the foregoing, it will be understood that a relatively limited number of print modes are achievable when printing in monochrome at high speeds using the dropped nozzle compensation methods described in U.S. Pat. No. 7,290,852. Notwithstanding this limitation, the fundamental design of the print chip described in U.S. Pat. No. 7,290,852, incorporating the dropped nozzle region, remains a very attractive means for designing page wide printheads for high-speed printing. The dropped nozzle region enables print chips to be butted together in a row, which narrows the print zone and avoids positioning chips in a relatively wider staggered array. Narrowing the print zone advantageously places fewer demands on media feed mechanisms and generally achieves higher print quality than other page wide systems having relatively wider print zones.

It would therefore be desirable to provide a means by which print chips incorporating dropped nozzles rows can be used for high-speed monochrome printing in a wider range of print modes.

SUMMARY OF THE INVENTION

In a first aspect, there is provided a method of printing an image from a printhead module having a plurality of horizontal nozzle rows, each nozzle row having a main row portion and a corresponding dropped row portion vertically offset from the main row portion, the method comprising the steps of:

- allocating first dot data for an image line of the image to nozzles in a main row portion of a first nozzle row;
- allocating second dot data for the image line to nozzles in a dropped row portion of the first nozzle row;
- sending the first dot data to the printhead module and firing droplets, based on the first dot data, from nozzles of the main row portion;
- sending the second dot data to the printhead module and firing droplets, based on the second dot data, from nozzles of the corresponding dropped row portion, wherein:

- one or more bits of the first dot data correspond to pixels of the image line aligned with the dropped row portion; and
- one or more bits of the second dot data correspond to pixels of the image line aligned with the main row portion.

Preferably, the bits of the first dot data are allocated to nozzles of the main portion proximal the dropped row portion.

Preferably, the bits of the second dot data are allocated to nozzles of the dropped row portion proximal the main row portion.

Preferably, the first nozzle row of the dropped row portion corresponds to the first nozzle row of the main row portion.

Preferably, the second nozzle row of the dropped row portion does not correspond with the first nozzle row of the main row portion.

Preferably, the dropped nozzle portion has a plurality of columnar zones, and the bits of second dot data aligned with the main nozzle portion are ramped across the columnar zones towards the main nozzle portion.

Preferably, allocation of first and second dot data to nozzles of the main row portion and dropped row portion is performed in a printer controller communicating with the printhead module.

Preferably, the printhead module has redundant nozzle rows.

Preferably, the printhead module is a monochrome printhead module having all nozzle rows supplied with a same color ink.

Preferably, the nozzle rows of the dropped nozzle portion together are generally trapezoidal or triangular in plan view.

In one preferred embodiment:

- third dot data for the image line is allocated to a second nozzle row of the main row portion;
- fourth dot data for the image line of is allocated to the corresponding the second nozzle row of the dropped row portion;
- one or more bits of the third dot data correspond to pixels of the image line aligned with the dropped row portion; and
- one or more bits of the fourth dot data correspond to pixels of the image line aligned with the main row portion.

Preferably, the first and second dot data correspond to even pixels of the image line, and the third and fourth dot data correspond to odd pixels of the image line or vice versa.

Preferably, the second dot data is sent to the printhead module after the first dot data.

Preferably, the dot data comprises a '1' for an enabled firing nozzle and a '0' for a non-enabled non-firing nozzle.

In a second aspect, there is provided a method of printing an image from a printhead module having a plurality of horizontal nozzle rows, each nozzle row having a main row portion and a corresponding dropped row portion vertically offset from the main row portion, the method comprising the steps of:

- allocating first dot data for an image line of the image to nozzles of the main row portion of the first nozzle row;
- allocating second dot data for the image line to nozzles of the dropped row portion of a second nozzle row;
- sending the first dot data to the printhead module and firing droplets, based on the first dot data, from nozzles of the main row portion of the first nozzle row;
- sending the second dot data to the printhead module and firing droplets, based on the second dot data, from nozzles of the dropped row portion of the second nozzle row, wherein:

- each nozzle row of the printhead module has a same number of nozzles N; and
- the first nozzle row and the second nozzle row are non-corresponding nozzle rows, such that several nozzles contained in the main portion of the first nozzle row and a number of nozzles contained in the dropped row portion of the second nozzle row together is greater or fewer than N nozzles.

Preferably, the second nozzle row of the dropped row portion contains a greater number of nozzles than a first nozzle row of the dropped row portion corresponding to the first nozzle row of the main row portion.

Preferably, only nozzles from the second nozzle row of the dropped row portion that are aligned with nozzles from first nozzle row of the main row portion are used for firing droplets.

Preferably, all nozzles from the second nozzle row of the dropped row portion are used for firing droplets, such that one or more pixels are printed by both a nozzle from the main row portion and a nozzle from the dropped row portion.

Preferably, the method further comprises the steps of:
- allocating third dot data for the image line of the image to nozzles of a third nozzle row of the main row portion;
- allocating fourth dot data for the image line of the image to nozzles of a fourth nozzle row of the dropped row portion;
- sending the third dot data to the printhead module and firing droplets, based on the third dot data, from nozzles of the main row portion of the third nozzle row;
- sending the fourth dot data to the printhead module and firing droplets, based on the fourth dot data, from nozzles of the dropped row portion of the fourth nozzle row, wherein the third nozzle row and the fourth nozzle row are non-corresponding nozzle rows, such that several nozzles contained in the main portion of the third nozzle row and several nozzles contained in the dropped row portion of the fourth nozzle row together is greater or fewer than N nozzles.

Preferably, the first and second dot data correspond to even pixels of the image line, and wherein the third and fourth dot data correspond to odd pixels of the image line, or vice versa.

Preferably, the main row portion of the first nozzle row and the dropped row portion of the second nozzle row together contain greater than N nozzles; and the main row portion of the third nozzle row and the main row portion of the fourth nozzle row together contain fewer than N nozzles.

Preferably, one or more bits of the first dot data correspond to pixels of the image line aligned with the dropped row portion; and one or more bits of the second dot data correspond to pixels of the image line aligned with the main row portion.

Preferably, bits of the first dot data are allocated to nozzles of the main portion proximal the dropped row portion.

Preferably, bits of the second dot data are allocated to nozzles of the dropped row portion proximal the main row portion.

Preferably, the dropped nozzle portion has a plurality of columnar zones, and one or more bits of second dot data are ramped across the columnar zones towards the main nozzle portion.

Preferably, allocation of first and second dot data to nozzles of the main row portion and dropped row portion is performed in a printer controller communicating with the printhead module.

In some embodiments, the printhead module has redundant nozzle rows.

Preferably, the printhead module is a monochrome printhead module having all nozzle rows supplied with a same color ink.

Preferably, the second dot data is sent to the printhead module after the first dot data.

Preferably, the dot data comprises a '1' for an enabled firing nozzle and a '0' for a non-enabled non-firing nozzle.

As used herein, the term "ink" refers to any ejectable fluid and may include, for example, conventional CMYK inks (e.g., pigment and dye-based inks), infrared inks, UV-curable inks, fixatives, primers, binders, 3D printing fluids, polymers, sensing inks, biological fluids etc.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
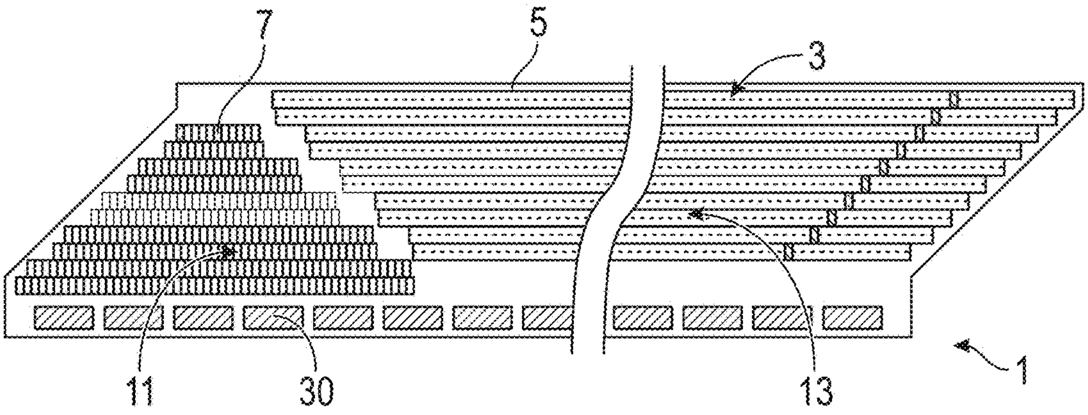
FIG. 1 shows a print chip having a dropped nozzle region.

Referring to FIG. 1, the printing methods described herein employ printhead modules, typically in the form of print chips as described in, for example, U.S. Pat. No. 7,290,852. Accordingly, each print chip comprises horizontal rows of nozzles extending parallel with a longitudinal axis of the print chip. Each nozzle row has a main row portion and a corresponding displaced ("dropped") row portion, which is vertically offset from its main row portion.

Figure 2:
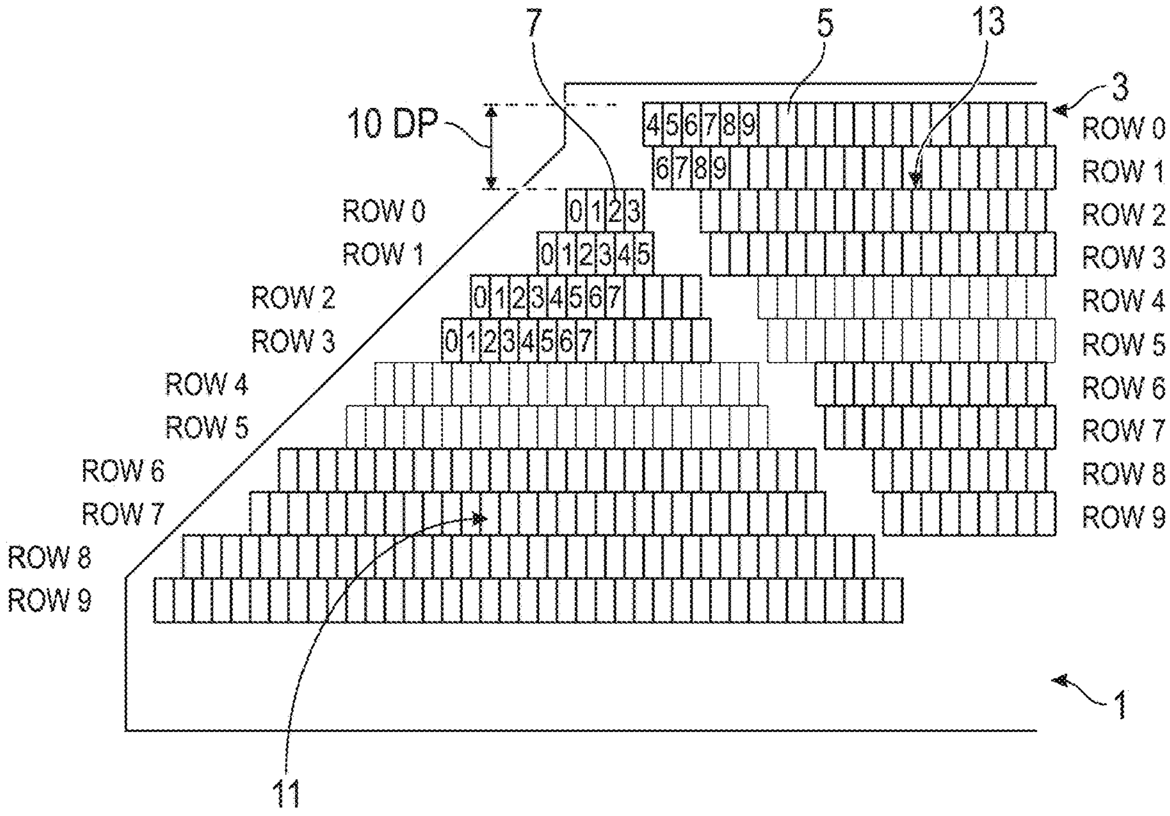
FIG. 2 is a magnified view of the dropped nozzle region.
Figure 3:
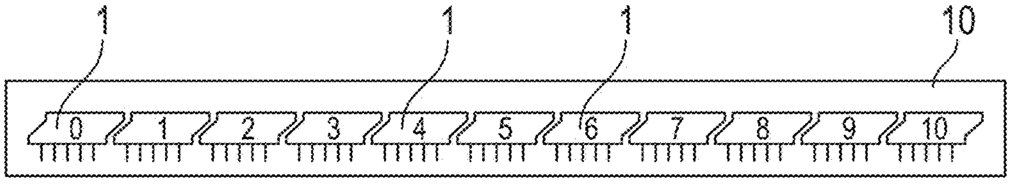
FIG. 3 is a schematic view of a printhead having multiple butting print chips.

For the sake of convenience, the print chip is defined to have a nominal horizontal axis extending parallel with its length dimension and a nominal vertical axis extending perpendicular to the horizontal axis. As used herein, the terms "horizontal" and "vertical" are not intended to limit the orientation of print chips or nozzles rows in use. Furthermore, the term "dropped" (e.g., "dropped row portion", "dropped nozzle region" etc.) is not intended to limit the orientation of the print chip relative to a media feed direction—a "dropped row portion" merely means that a row portion is displaced, either upstream or downstream relative to a media feed direction, of a corresponding main row portion Nozzles in the main row portion extend along most of the length of the print chip, while nozzles in the dropped row portion are positioned at one end of the print chip. The total number of nozzles in each main row portion and corresponding dropped row portion is the same for all nozzle rows (e.g., 640 nozzles per row). However, the dropped row portions each have different lengths and, as shown in FIGS. 1 and 2, are together arranged in a generally trapezoidal shape in plan view. The multiple dropped row portions having a trapezoidal shape are together referred to as a "dropped nozzle region" of the print chip.

The print chip shown in FIGS. 1 and 2 contains five ink planes, which are all supplied with a same color of ink for monochrome printing. Each ink plane contains two nozzle rows ("odd" and "even") horizontally offset from each other by 1 dot pitch. Since the nozzles within the same nozzle row are spaced apart by 2 dot pitches, then the odd and even nozzle rows in one ink plane can print odd and even dots in one line of print. In the embodiment shown, the odd and even nozzle rows within the same ink plane are vertically offset from each other by 4 dot pitches, while each dropped row portion is offset from its corresponding main row portion by 10 dot pitches (at a nominal 1600 dpi).

While one embodiment is described herein with reference to a Memjet print chip printing at a nominal 1600 (horizontal)×1600 (vertical) dpi, it will of course be appreciated that the present invention is not limited by way of print resolution or print speed.

Figure 4:
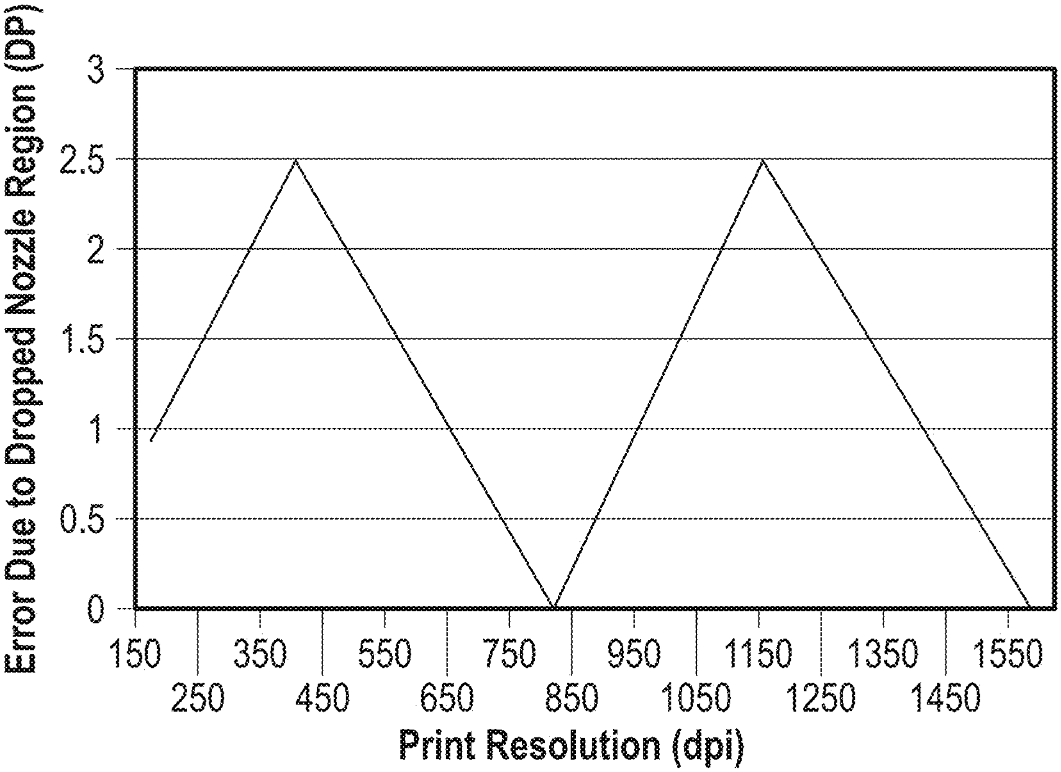
FIG. 4 shows dot placement errors resulting from dropped nozzle region artefacts in various print modes.

As best seen in FIG. 2, each dropped row portion is positioned to align horizontally with its corresponding main row portion such that a constant dot pitch is effectively maintained both along the print chip and between neighboring print chips. In this way, the dropped row portions can, in principle, compensate for printing in the join regions between neighboring print chips where nozzles cannot be fabricated due to a lack of available silicon at the edges of the print chips. Nevertheless, due to the problems foreshadowed above, the print chip described U.S. Pat. No. 7,290,852 is not ideally suited for fast printing (e.g., at a nominal 5×print speed) in monochrome for all printing resolutions. For example, as explained above and with reference to FIG. 4, when printing in monochrome at 1200 dpi and 5×print speed, errors of 2.5 DP occur between the main nozzle region and the dropped nozzle region. This error produces noticeable artefacts on the printed page.

First Method (Ramped Dot Data)

To print, for example, at 1200 dpi at 5×print speed using the Memjet® print chip 1, each nozzle row 3 has a main row portion 5 printing dots for a predetermined image line while the dropped row portion 7 prints dots for the next image line downstream. Although this method of printing produces an error of 2.5 DP, this is the closest alignment achievable in this print mode, since the print chip must fire its nozzles row-by-row (including the main nozzle region and the corresponding dropped nozzle region from each nozzle row).

While the error of 2.5 DP is unavoidable in this instance, the noticeability of the consequent print artefact can be minimized by ramping dot data from the main nozzle region into dropped nozzle region. Accordingly, some nozzles of the main nozzle region proximal the dropped nozzle region receive dot data for part of the image line allocated to the corresponding main nozzle portion; and, likewise, some nozzles of the dropped nozzle region receive dot data for part of the image line allocated to the main nozzle region. Effectively, some of the dot data is swapped between the main nozzle region and the dropped nozzle region.

Alternate nozzles may be used to ramp the dot data in this way. More sophisticatedly, the dropped nozzle region may be divided into a plurality of columnar zones with dot data swapped between predetermined zones of the dropped nozzle region and main nozzle region.

Intuitively, one might suppose that ramping dot data in this way by swapping some of the dot data between the dropped nozzle region and the main nozzle region would have the effect of worsening print quality. After all, fewer droplets ultimately land at their intended pixel position on the media. However, ramping of dot data has the effect of smoothing the transition from the main nozzle region to the dropped nozzle region as opposed to a step jump between the two regions. In practice, the step jump manifests in a visible line down a printed page, whereas the ramped transition is far less visually noticeable. Therefore, the use of ramped dot data significantly improves overall print quality.

Second Method (Mis-Matched Main Nozzle Rows and Dropped Nozzle Rows)

As described above, the main nozzle region 13 and dropped nozzle region 11 are designed to provide a constant dot pitch across the print chip 1 and between neighboring print chips by delaying data for each dropped row portion 7 such that its printed dots join with a line of dots printed by its corresponding main row portion 5.

The problem of monochrome printing at high speed in certain print modes may be further addressed by using one or more mis-matched (i.e., non-corresponding) nozzle rows from the dropped nozzle region. As explained above, an image line printed by Row 0 and 1 (even and odd dots) in the main nozzle region cannot be adequately compensated by Rows 0 and 1 of the dropped nozzle region (positioned $10/1600^{th}$ inch away from the corresponding rows of the main nozzle region) when printing at 5×print speed at 1200 dpi, because the media has moved by 7.5 image lines during one fire cycle or 15 image lines during two fire cycles. However, Rows 6 and 7 of the dropped nozzle region (positioned $40/1600^{th}$ inch from Row 0 of the main nozzle region) can compensate perfectly by delaying data by 30 image lines (corresponding to four fire cycles at 1200 dpi). In this example, Rows 6 and 7 of the dropped nozzle region have a greater number of nozzles than Rows 0 and 1 of the dropped nozzle region and so only those nozzles from Row 6 and 7 which are aligned with Rows 0 and 1 can be used to compensate. Thus, the line of dots printed from the Rows 6 and 7 of the dropped nozzle region can join seamlessly with the image line printed by Rows 0 and 1 of the main nozzle region.

However, it is not always possible to compensate using non-corresponding nozzle rows from the dropped nozzle region that are longer than the nozzle rows corresponding with the main nozzle region. If, for example, an image line is printed in the main nozzle region by Rows 7 and 8, but by Rows 9 and 0 of the dropped nozzle region then there will missing dots when Row 0 (dropped nozzle region) joins with Row 8 (main nozzle region) and, potentially, extra dots when Row 9 (dropped nozzle region) joins with Row 7 (main nozzle region). In this scenario, it is preferable to double print some dots using aligned nozzles from Row 9 (dropped nozzle region) and Row 7 (main nozzle region) to maintain, as far as possible, ink density across the join. In practice, ink bleed reduces the noticeability of this artefact. Thus, the step error caused by the dropped nozzle region in certain print modes can be reduced at the expense of some double-printing and/or unprintable dots in the dropped nozzle region.

Once again, intuitively one might suppose that this method of compensation would produce worse visual artefacts than the aforementioned step errors. However, if the non-corresponding nozzles rows from the dropped nozzle region are selected carefully, then the overall visual effect is much less noticeable than the step errors produced in certain print modes by the dropped nozzle region. Typically, as exemplified above, the non-corresponding even and odd rows in the dropped nozzle region are selected such that one is longer and one is shorter than the actual corresponding nozzle rows in the dropped nozzle region to maintain, as far as possible, a printed ink density.

The first and second methods described hereinabove may be used in combination to further minimize the noticeability of visible print artefacts relating to the dropped nozzle region, which arise from high-speed monochrome printing in certain print modes.

Figure 5A:
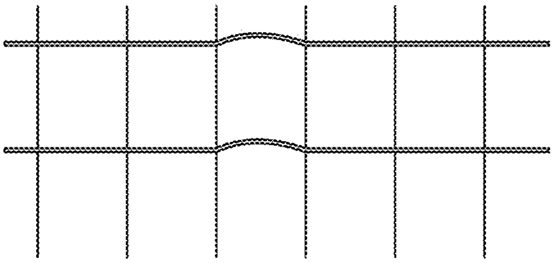
FIGS. 5A and 5B are simulated test prints using printing methods described herein.
Figure 5B:
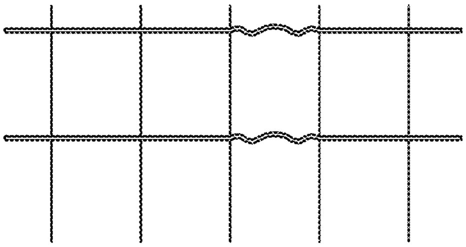

FIGS. 5A and 5B are simulated test prints showing the combined effects of the first and second methods described above when printing at 400 dpi at a nominal 5×print speed. In FIG. 5A, using the method described in U.S. Pat. No. 7,290,852, the join region between two neighboring print chips is visible as a hump due to imperfect dot placement in the dropped nozzle region. However, as shown in FIG. 5B, with the use of ramped dot data and mismatched dropped nozzle rows, the join region becomes much less noticeable in the same print mode.

It will, of course, be appreciated that the present invention has been described by way of example only and that modifications of detail may be made within the scope of the invention, which is defined in the accompanying claims.

The invention claimed is:

1. A method of printing an image from a print chip having a plurality of horizontal nozzle rows, each nozzle row having a first row portion and a vertically offset second row portion that does not overlap with the first row portion, the method comprising the steps of:

allocating first dot data for an image line of the image to nozzles in a first row portion of a first nozzle row;

allocating second dot data for the image line to nozzles in a second row portion of the first nozzle row or another nozzle row;

sending the first dot data to the print chip and firing droplets, based on the first dot data, from nozzles of the first row portion;

sending the second dot data to the print chip and firing droplets, based on the second dot data, from nozzles of the second row portion, wherein:

one or more bits of the first dot data correspond to pixels of the image line aligned with the second row portion; and one or more bits of the second dot data correspond to pixels of the image line aligned with the first row portion.

2. The method of claim 1, wherein said bits of the first dot data are allocated to nozzles of the first and second row portions.

3. The method of claim 2, wherein said bits of the second dot data are allocated to nozzles of the second row portion proximal the first row portion.

4. The method of claim 1, wherein allocation of first and second dot data to nozzles of the first and second row portions is performed in a printer controller communicating with the print chip.

5. The method of claim 1, wherein the print chip has redundant nozzle rows.

6. The method of claim 1, wherein the print chip is a monochrome print chip having all nozzle rows supplied with a same color ink.

7. The method of claim 1, wherein first row portions or second row portions together are generally trapezoidal or triangular in plan view.

8. The method of claim 1, wherein the second dot data is sent to the print chip after the first dot data.

9. The method of claim 1, wherein the dot data comprises a '1' for an enabled firing nozzle and a '0' for a non-enabled non-firing nozzle.

10. The method of claim 1, wherein the first and second row portions of each nozzle row have different lengths.

* * * * *